US010476061B1

(12) United States Patent
Groebl

(10) Patent No.: US 10,476,061 B1
(45) Date of Patent: Nov. 12, 2019

(54) ELECTRIC VEHICLE CABIN FLOOR STRUCTURE

(71) Applicant: SF Motors, Inc., Santa Clara, CA (US)

(72) Inventor: David Warren Groebl, Santa Clara, CA (US)

(73) Assignees: CHONGQING JINKANG NEW ENERGY VEHICLE CO., LTD., Chongqing (CN); SF MOTORS, INC., Santa Clara, CA (US)

(*) Notice: Subject to any disclaimer, the term of this patent is extended or adjusted under 35 U.S.C. 154(b) by 0 days.

(21) Appl. No.: 16/237,476

(22) Filed: Dec. 31, 2018

(51) Int. Cl.
  *B60L 50/64* (2019.01)
  *H01M 2/10* (2006.01)
  *B60L 50/60* (2019.01)

(52) U.S. Cl.
  CPC .......... *H01M 2/1083* (2013.01); *B60L 50/64* (2019.02); *B60L 50/66* (2019.02)

(58) Field of Classification Search
  CPC ...... H01M 2/1083; B60L 50/66; B60L 50/64; B60K 1/04; B60K 2001/0438
  See application file for complete search history.

(56) References Cited

U.S. PATENT DOCUMENTS

| | | | | |
|---|---|---|---|---|
| 8,939,246 B2* | 1/2015 | Yamaguchi | ............... | B60K 1/04 180/68.5 |
| 9,033,083 B2* | 5/2015 | Kashiwagi | .......... | B60L 11/1825 180/68.5 |
| 9,656,571 B2* | 5/2017 | Nusier | ................ | B60L 11/1879 |
| 9,725,004 B2* | 8/2017 | Asai | .......................... | B60K 1/04 |
| 9,821,678 B2* | 11/2017 | Nusier | ................ | B60L 11/1879 |
| 10,059,382 B2* | 8/2018 | Nusier | ................ | H01M 2/1077 |
| 10,158,106 B2* | 12/2018 | Marpu | ..................... | B60K 6/28 |
| 2003/0124315 A1* | 7/2003 | Grochoski | ................ | B32B 3/12 428/180 |
| 2005/0200062 A1* | 9/2005 | Maurer | ..................... | F16F 7/08 267/144 |
| 2011/0240386 A1* | 10/2011 | Czinger | ................... | B60K 1/00 180/65.31 |
| 2012/0160583 A1* | 6/2012 | Rawlinson | .............. | F41H 7/042 180/68.5 |
| 2012/0223113 A1* | 9/2012 | Gaisne | ............... | H01M 2/1083 224/538 |
| 2012/0286541 A1* | 11/2012 | Kashiwagi | ......... | B60L 11/1825 296/193.07 |
| 2013/0118824 A1* | 5/2013 | Maeda | ................. | B62D 21/157 180/68.5 |

(Continued)

*Primary Examiner* — Jacob B Meyer
(74) *Attorney, Agent, or Firm* — Foley & Lardner LLP; James De Vellis

(57) ABSTRACT

Provided herein are apparatus, systems, and methods for reducing noise in an electric vehicle. The apparatus can include a cabin floor, a battery pack, and a stiffener positioned between the cabin floor and the battery pack. The cabin floor can include a recess that that defines a volume in the cabin floor. The battery pack is coupled to the cabin floor, and includes a plurality of battery cells generating a voltage and a current. The stiffener includes a first stiffener surface that faces the cabin floor, a second stiffener surface that faces the battery pack, and a first stiffener element that extends out of the first stiffener surface and conforms to a shape of the recess. The first stiffener element is positioned on the first stiffener surface to align with a position of the recess in the cabin floor.

20 Claims, 9 Drawing Sheets

(56) References Cited

U.S. PATENT DOCUMENTS

| | | | | |
|---|---|---|---|---|
| 2013/0229030 | A1* | 9/2013 | Yamaguchi | B60K 1/04 |
| | | | | 296/193.07 |
| 2014/0017546 | A1* | 1/2014 | Yanagi | H01M 2/1083 |
| | | | | 429/120 |
| 2014/0338999 | A1* | 11/2014 | Fujii | B60K 1/04 |
| | | | | 180/68.5 |
| 2015/0249240 | A1* | 9/2015 | Hihara | B60K 1/04 |
| | | | | 180/68.5 |
| 2016/0229308 | A1* | 8/2016 | Nusier | B60L 11/1879 |
| 2016/0233460 | A1* | 8/2016 | Nusier | H01M 2/1077 |
| 2016/0233467 | A1* | 8/2016 | Nusier | H01M 2/1083 |
| 2016/0243948 | A1* | 8/2016 | Asai | B60L 50/64 |
| 2016/0318556 | A1* | 11/2016 | Ikeda | B60K 1/04 |
| 2016/0375750 | A1* | 12/2016 | Hokazono | B60K 1/04 |
| | | | | 180/68.5 |
| 2017/0149035 | A1* | 5/2017 | Sham | B60K 1/04 |
| 2017/0217330 | A1* | 8/2017 | Nusier | B60L 11/1879 |
| 2017/0217503 | A1* | 8/2017 | Nusier | H01M 2/1077 |
| 2017/0229690 | A1* | 8/2017 | Marpu | B60K 6/28 |
| 2017/0305250 | A1* | 10/2017 | Hara | B60K 1/04 |
| 2018/0015839 | A1* | 1/2018 | Ito | B60K 11/04 |
| 2018/0083253 | A1* | 3/2018 | Dulle | B60R 16/03 |
| 2018/0086388 | A1* | 3/2018 | Dupper | B62D 25/2072 |
| 2018/0126933 | A1* | 5/2018 | Kawase | B60K 1/04 |
| 2018/0154789 | A1* | 6/2018 | Janku | B60S 5/06 |
| 2018/0212216 | A1* | 7/2018 | Handing | H01M 2/1083 |
| 2018/0237075 | A1* | 8/2018 | Kawabe | B60L 50/66 |
| 2018/0281577 | A1* | 10/2018 | Acikgoez | B60K 1/04 |
| 2018/0290531 | A1* | 10/2018 | Ajisaka | B60K 1/04 |
| 2018/0337377 | A1* | 11/2018 | Stephens | H01M 2/1083 |
| 2019/0009661 | A1* | 1/2019 | Okamura | B60K 1/04 |
| 2019/0047419 | A1* | 2/2019 | Kellner | B60L 50/64 |
| 2019/0081297 | A1* | 3/2019 | Nakamori | B60K 1/04 |
| 2019/0100090 | A1* | 4/2019 | Matecki | B60K 1/04 |
| 2019/0148690 | A1* | 5/2019 | Newman | H01M 2/1083 |

* cited by examiner

ELECTRIC VEHICLE CABIN FLOOR STRUCTURE

BACKGROUND

Batteries can include electrochemical cells to supply electrical power to various electrical components connected thereto. Such batteries can be installed in a vehicle such as an automobile to provide electrical energy to various electrical systems installed within the vehicle.

SUMMARY

At least one aspect is directed to an electric vehicle apparatus including a cabin, a battery pack, and a stiffener. The cabin is positioned between a front portion and a rear portion of an electric vehicle. The cabin includes cabin frame side rails, and a cabin floor that extends between the cabin frame side rails. The cabin floor includes a first cabin floor surface and a second cabin floor surface, the first cabin floor surface is positioned on an underside of the electric vehicle. The first cabin floor surface includes a recess that defines a volume in the cabin floor. The battery pack is coupled to the cabin floor, and includes a plurality of battery cells generating a voltage and a current, the battery pack providing the voltage and the current to the electric vehicle, and a first battery pack surface that faces the first cabin floor surface. The stiffener is disposed between the battery pack and the cabin floor for imparting stiffness to the cabin floor. The stiffener includes a first stiffener surface that faces the first cabin floor surface, a second stiffener surface that faces the first battery pack surface, and a first stiffener element that extends out of the first stiffener surface and conforms to a shape of the recess. The first stiffener element is positioned on the first stiffener surface to align with a position of the recess in the first cabin floor surface.

At least one aspect is directed to a method to improve stiffness of a cabin floor of an electric vehicle. The method can include providing a cabin positioned between a front portion and a rear portion of an electric vehicle including cabin frame side rails, and a cabin floor that extends between the cabin frame side rails, the cabin floor including a first cabin floor surface and a second cabin floor surface, the first cabin floor surface positioned on an underside of the electric vehicle, the first cabin floor surface including a recess that defines a volume in the cabin floor. The method can further include covering at least a portion of a first cabin floor surface with a stiffener, the stiffener having a first stiffener surface that faces the first cabin floor surface, a second stiffener surface opposite the first stiffener surface, and a first stiffener element that extends out of the first stiffener surface and conforms to a shape of the recess, the first stiffener element positioned on the first stiffener surface to align with a position of the recess in the first cabin floor surface. The method also includes covering the second stiffener surface with a battery pack including a plurality of battery cells generating a voltage and a current, the battery pack providing the voltage and the current to the electric vehicle, the battery pack having a first battery pack surface that faces the cabin floor surface. The method further includes coupling the battery pack to the cabin floor.

At least one aspect is directed to an electric vehicle. The electric vehicle can include a chassis including a cabin, a battery pack, and a stiffener. The cabin is positioned between a front portion and a rear portion of an electric vehicle. The cabin includes cabin frame side rails, and a cabin floor that extends between the cabin frame side rails. The cabin floor includes a first cabin floor surface and a second cabin floor surface, the first cabin floor surface is positioned on an underside of the electric vehicle. The first cabin floor surface includes a recess that defines a volume in the cabin floor. The battery pack is coupled to the cabin floor, and includes a plurality of battery cells generating a voltage and a current, the battery pack providing the voltage and the current to the electric vehicle, and a first battery pack surface that faces the first cabin floor surface. The stiffener is disposed between the battery pack and the cabin floor for imparting stiffness to the cabin floor. The stiffener includes a first stiffener surface that faces the first cabin floor surface, a second stiffener surface that faces the first battery pack surface, and a first stiffener element that extends out of the first stiffener surface and conforms to a shape of the recess. The first stiffener element is positioned on the first stiffener surface to align with a position of the recess in the first cabin floor surface.

At least one aspect is directed to a method. The method can include providing an apparatus. The apparatus can be included in an electric vehicle. The apparatus can include a cabin, a battery pack, and a stiffener. The cabin is positioned between a front portion and a rear portion of an electric vehicle. The cabin includes cabin frame side rails, and a cabin floor that extends between the cabin frame side rails. The cabin floor includes a first cabin floor surface and a second cabin floor surface, the first cabin floor surface is positioned on an underside of the electric vehicle. The first cabin floor surface includes a recess that defines a volume in the cabin floor. The battery pack is coupled to the cabin floor, and includes a plurality of battery cells generating a voltage and a current, the battery pack providing the voltage and the current to the electric vehicle, and a first battery pack surface that faces the first cabin floor surface. The stiffener is disposed between the battery pack and the cabin floor for imparting stiffness to the cabin floor. The stiffener includes a first stiffener surface that faces the first cabin floor surface, a second stiffener surface that faces the first battery pack surface, and a first stiffener element that extends out of the first stiffener surface and conforms to a shape of the recess. The first stiffener element is positioned on the first stiffener surface to align with a position of the recess in the first cabin floor surface.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
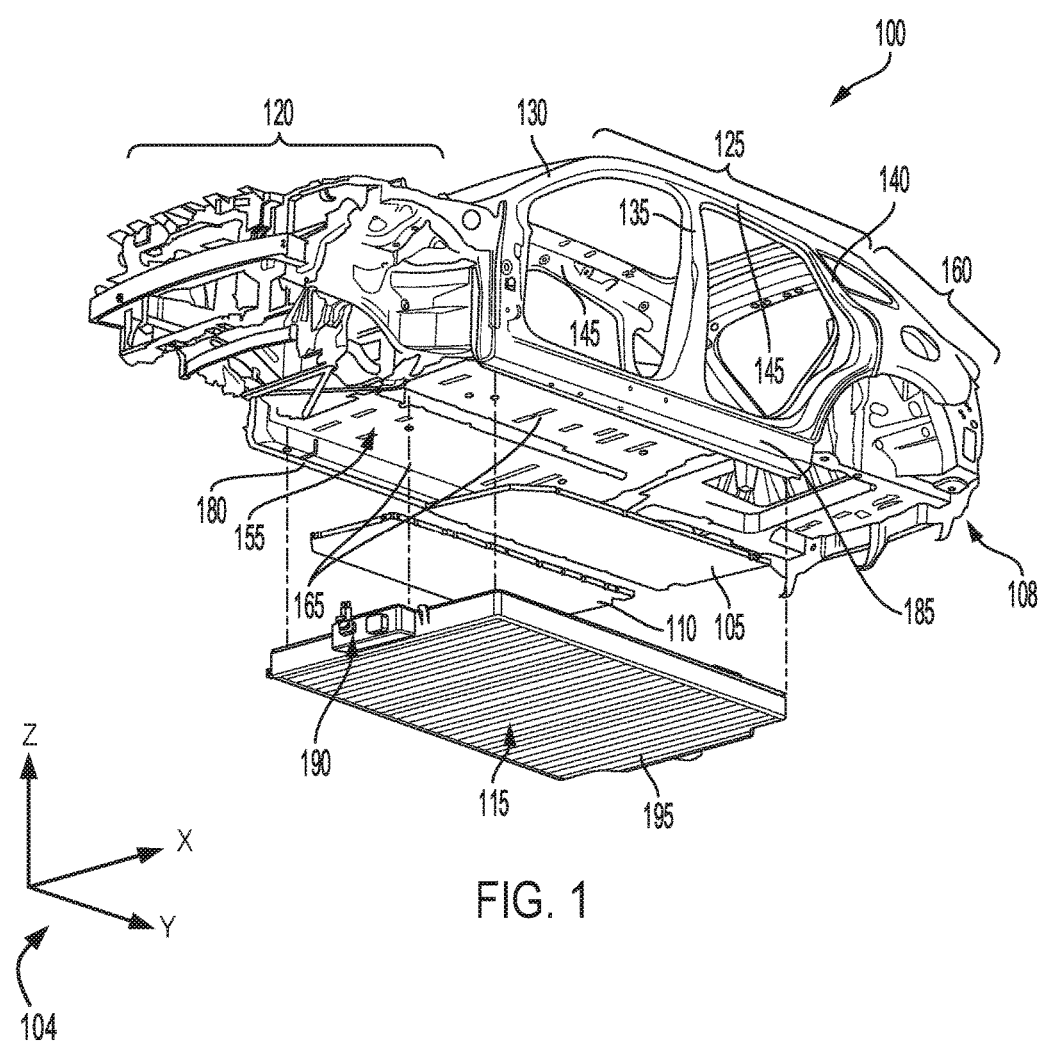
FIG. 1 shows an isometric view of a system of an electric vehicle including at least one stiffener.

Following below are more detailed descriptions of various concepts related to, and implementations of electric vehicles having a cabin floor stiffener to stiffen the cabin floor and minimize cabin noise. The various concepts introduced above and discussed in greater detail below can be implemented in any of numerous ways.

Described herein is cabin floor stiffening device for an automotive configuration. An automotive configuration includes a configuration, arrangement or network of electrical, electronic, mechanical or electromechanical devices within a vehicle of any type. An automotive configuration can include battery cells for battery packs in electric vehicles (EVs). EVs can include electric automobiles, cars, motorcycles, scooters, passenger vehicles, hybrid vehicles, passenger or commercial trucks, and other vehicles such as sea or air transport vehicles, planes, helicopters, submarines, boats, or drones. EVs can be fully autonomous, partially autonomous, or unmanned.

EVs can include a chassis or a frame over which various components of the EV, such as a body, a motor, a transmission, suspension, wheels, etc., are mounted. The chassis can include a cabin that accommodates seats for a driver and one or more passengers. The cabin can include a cabin floor that supports the seats and other components within the cabin. The cabin floor can be formed of a sheet metal, such as steel or aluminum, or an alloy. Vehicle operation can result in vibrations in the chassis, and in particular in the cabin floor. The vibrations in the cabin floor can in turn result in audible noise, which can be discomforting to the driver and the passengers. One approach to reducing the audible noise is adding sound deadening materials, such as liquid applied sound deadening (LASD) on the cabin floor, inside the cabin. The sound deadening material can reduce the audible noise, but is heavy and can undesirably increase the gross weight of the vehicle. In another approach, a soft foam can be positioned between a bottom surface of the cabin floor and a battery pack coupled to the bottom of the cabin floor, outside of the cabin. However, the soft foam can get damaged by absorption of moisture or water. In some instances, the soft foam can be sealed in a water-proof bag or coating. But this can increase costs and the risk of the water-proof bag or coating puncturing or deteriorating over time and causing damage to the soft-foam.

In one aspect, the problem of noise in the cabin floor can be addressed by including a rigid stiffener between the cabin floor and the battery pack, which is coupled to the cabin floor outside of the cabin. The stiffener can be a rigid material that can improve the stiffness of the cabin floor thereby reducing the vibrations in the cabin floor and reducing the audible noise caused by those vibrations. The stiffener can be press-fit between the stiff battery pack and the cabin floor. This can allow the stiffness of the battery pack to contribute to the overall stiffness of the cabin floor. The stiffener can be formed on one or more material that are non-permeable and non-absorbent, thereby protecting the stiffener from moisture or water damage. The stiffener can be shaped to complement the shape of the cabin floor. In particular, the stiffener can include recesses and protrusions that conform to protrusions and recesses, respectively, in the cabin floor. Conforming the shape of the stiffener to the shape of the cabin floor can further improve the coupling between the cabin floor, the stiffener, and the battery pack, and improve the overall stiffness of the cabin floor.

FIG. 1 shows an isometric view of a system or apparatus 100 of an electric vehicle including at least one stiffener. The system 100 includes a chassis 108, a first stiffener 105, a second stiffener 110, and a battery pack 115. The chassis 108 can include a front structure 120, a cabin 125, and a rear structure 160. The front structure 120 can support several components of the electric vehicle, such as a motor, an engine, batteries, front wheel assembly, a transmission, etc. The cabin 125 can include a pair of A-pillars 130, a pair of B-pillars 135, and a pair of C-pillars 140. The A-pillars 130, the B-pillars 135, and the C-pillars 140 can extend between roof rails 145 and cabin frame side rails. The cabin frame side rails can include a first cabin frame side rail 180 and a second cabin frame side rail 185. The first cabin frame side rail 180 and the second cabin frame side rail 185 can extend along the sides and the bottom of the cabin 125 between the front structure 120 and the rear structure 160. A cabin floor 155 can extend between the first cabin frame side rail 180 and the second cabin frame side rail 185. The cabin floor 155 can be fastened to the first cabin frame side rail 180 and to the second cabin frame side rail 185. Various fasteners such as bolts, clamps, joints, rivets, screws, and welds can be utilized to fasten the cabin floor 155 to the first and the second cabin frame side rails 180 and 185. The cabin 125 can support driver and passenger seats, a console, doors, etc. The rear structure 160 can support several components such as a rear wheel assembly, a transmission, a trunk, etc.

The cabin floor 155 can include a first cabin floor surface 165 on the underside of the cabin floor 155 and outside of the cabin 125, and a second cabin floor surface (not shown) opposite the first cabin floor surface 165 and inside of the cabin 125. The cabin floor 155 can be made of a sheet metal or sheet alloy, including materials such as steel, aluminum, carbon fiber, etc. The cabin floor 155 can have a thickness between 0.1 millimeters and 1 millimeter. In part due to the thickness and additionally in part due to the material used in forming the cabin floor 155, the cabin floor 155 can lack rigidity, which can make the cabin floor 155 susceptible to vibrations during vehicle operation. These vibrations can in turn result in audible noise, which can be discomforting to the drivers and passengers in the cabin 125. To improve the rigidity of the cabin floor 155, the first stiffener 105 and the second stiffener 110 can be disposed between the first cabin floor surface 165 and the battery pack 115.

The first stiffener 105 and the second stiffener 110 (collectively referred to herein as the stiffener 105/110) can be a made of a rigid material that is impermeable to moisture and liquids, such as water. The rigidity of the stiffener 105/110 can, in one example, be expressed in terms of its compressive strength. For example, the stiffener 105/110 can have a compressive strength value between 0.1 mega-pascals (MPa) and 0.4 MPa. The higher the compressive strength of the stiffener 105/110, the greater the rigidity. Impermeability of moisture can mitigate the risk of deterioration of the stiffener 105/110 due to contact with moisture and liquids. As the stiffener 105/110 is positioned outside of the vehicle interior, the stiffener 105/110 can be exposed to environmental conditions, which can include exposure to moisture, water, or other liquids such as oil, fuel (commonly used in vehicles) and acids and chemicals (commonly produced by batteries). Previous approaches to sound deadening used soft-foam (such as, e.g., PORON® microcellular polyurethanes) to absorb audible noise. But the soft-foam may also be absorbent to moisture and other liquids. These approaches used water-proof bags to cover the soft-foam as a barrier to moisture and liquids, thereby preventing absorption. However, the water-proof bags can be susceptible to puncture or leakage, thereby increasing the risk of moisture of liquid coming in contact with and being absorbed by the soft-foam. Water absorption by the soft-foam may not only decrease the effectiveness in sound deadening but also increase the risk of deterioration of the soft-foam. Moreover, the damaged soft-foam may have to be replaced several times during the life of the vehicle, thereby increasing vehicle maintenance costs.

The stiffener 105/110 avoids the need for separate barriers, such as water-proof bags, from moisture or other liquids by being impermeable and non-absorbent to moisture and other liquids. The material used for forming the stiffener 105/110 can be both rigid and impermeable and non-absorbent to moisture and liquids. As an example, the material used for forming the stiffener 105/110 can include a rigid polyurethane foam. An example rigid impermeable polyurethane foam can include LAST-A-FOAM® FR-3700.

The battery pack 115 can include a plurality of battery cells (not shown) that generate a voltage and a current. The battery pack 115 can provide the combined voltage and current of the battery cells at a terminal 190 of the battery pack 115, which can be connected to various components of the electric vehicle. For example, the terminal 190 can be connected to electronic circuitry housed in the front structure 120 of the chassis 108. The battery pack 115 can have a flat brick shaped structure that has a first battery pack surface (not shown) that faces the first cabin floor surface 165, and a second battery pack surface 195 that is opposite to the first battery pack surface and faces away from the first cabin floor surface 165. The battery pack 115 can further include a plurality of side surfaces that extend between the first battery pack surface and the second battery pack surface 195. The first battery pack surface and the second battery pack surface 195 can be rectangular in shape. In some examples, the first battery pack surface and the second battery pack surface 195 have other shapes such as circular, elliptical, or polygonal (regular or irregular). In some instances, the perimeter of first battery pack surface and the second battery pack surface 195 can conform to the perimeter of the cabin floor 155. The battery pack 115 can have a length between 150 inches and 250 inches, as measured along the y-axis of a Cartesian reference frame 104, and can have a breadth between 40 inches and 120 inches, as measured along the x-axis of the Cartesian reference frame 104, and can have a thickness between 6 inches to 18 inches, as measured along the z-axis of the Cartesian reference frame 104. It should be understood that the dimensions of the battery pack 115 can vary based on the type of vehicle in which the battery pack 115 is used. For example, the dimensions of a battery pack in a truck or a sports-utility-vehicle can be larger than the corresponding dimension of a battery pack used in a sedan or a passenger vehicle. The length and the breadth of the battery pack 115 can also depend on the area available under the cabin floor 155 to accommodate the battery pack 115. The battery pack 115 can be fastened to the cabin fastened to the cabin floor 155 such that stiffener 105/110 is disposed between the battery pack 115 and the cabin floor 155.

Figure 2:
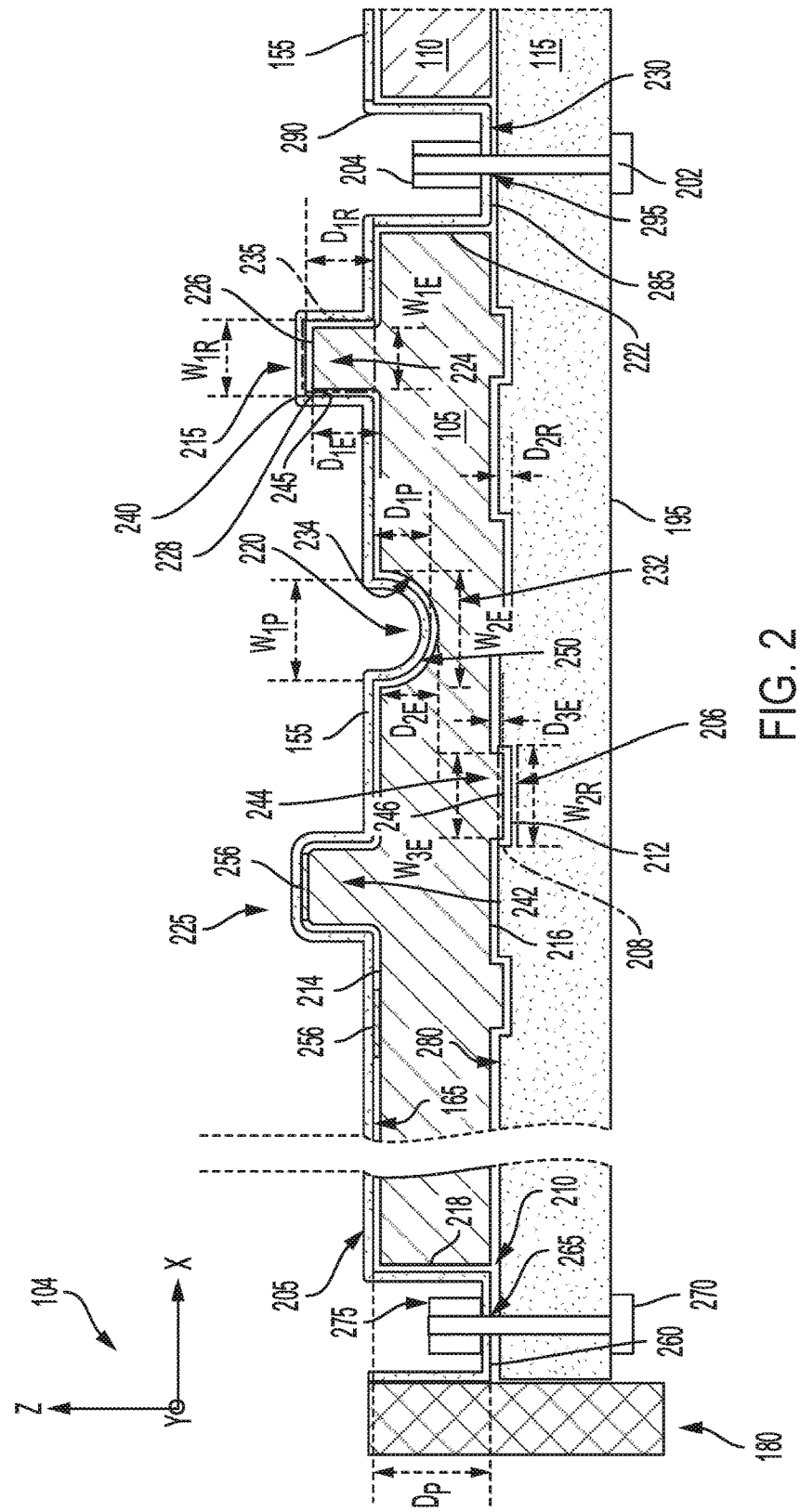
FIG. 2 shows a portion of a cross section of the system shown in FIG. 1.

FIG. 2 shows a portion of a cross section of the system 100 shown in FIG. 1. The cross-section can be taken along a plane that is parallel to the x-z plane of the Cartesian reference frame 104. FIG. 2 shows the first stiffener 105 and a second stiffener 110 disposed between the cabin floor 155 and the battery pack 115. The cabin floor 155 includes a first cabin floor surface 165 and a second cabin floor surface 205. The first cabin floor surface 165 is positioned on the underside of the vehicle and faces the battery pack 115. One portion of the cabin floor 155 is coupled to a first cabin frame side rail 180. The cabin floor 155 can be coupled to the first cabin frame side rail 180 using various fasteners such as bolts, clamps, joints, rivets, screws, and welds.

The cabin floor 155 can include features such as a pillar 210, a first recess 215, a protrusion 220, a second recess 225 and a central rib 230. These features in the cabin floor 155 can be formed to accommodate one or more components of the vehicle. For example, in features in the cabin floor 155 may be formed to improve the rigidity of the cabin floor 155. In some examples, these features can be formed to accommodate or support other components of the vehicle, such as, for example, seats, hydraulic lines, electric cables, etc. The first cabin floor surface 165 includes the first recess 215 that defines a volume 235 in the cabin floor 155. The first recess 215 can include a first recessed surface 240 that is offset from the first cabin floor surface 165. First recess sidewalls 245 extend between the first cabin floor surface 165 and the first recessed surface 240. The first recessed surface 240 can be flat or planar. The first recessed surface 240 can also be curved or have at least one portion that is flat and at least another portion that is curved. The first recessed surface 240 can be offset from the first cabin floor surface 165 by a distance $D_{1R}$, which can have a value between 1 mm and 50 mm. The first recess sidewalls 254 can be flat or planar. The first recess sidewalls 254 may also be curved or have at least one portion that is flat and at least another portion that is curved. The first recess sidewalls 254 can be spaced apart by a distance $W_{1R}$, which can have a value between 2 mm and 2 feet.

The first recess 215 can include sidewalls in addition to the first recess sidewalls 245 shown in FIG. 2 based on the geometry of the first recess 215. For example, the first recessed surface 240, when viewed in a direction normal to the cabin floor 155 (e.g., along the z-axis) can have various shapes such as circular, oval, rectangular, regular or irregular polygonal, etc. The sidewalls, including the first recess sidewalls 245, can extend between the perimeter of the first recessed surface 240 and the first cabin floor surface 165. In such examples, the first recess 215 can also include a dimension along the y-axis. The volume 235 can be a volume bounded by the first recessed surface 240 and the sidewalls extending between the first recessed surface 240 and the first cabin floor surface 165. In some examples, the first recess 215 can be a channel formed in the cabin floor 155, and can extend along the first cabin floor surface 165. The second recess 225 can be similar to the first recess 215. In some examples, the second recess 225 can have at least one dimension with a value that is different form the value of the corresponding dimension of the first recess 215.

The protrusion 220 can be raised portion of the first cabin floor surface 165. The protrusion 220 can include a protruding surface 250 that extends normal to the plane of the first cabin floor surface 165. For example, the protruding surface 250 extends along the y-axis of the Cartesian reference frame 104. The protruding surface 250 can be curved. The protruding surface 250 can also be flat or planar. The protruding surface 250 can have at least one portion that is flat or planar and at least another surface that can be curved. The extent to which the protruding surface 250 extends normal to the first cabin floor surface 165 can be denoted by $D_{1P}$, which can have a value between 1 mm and 50 mm. In some examples, the protrusion 220 can include sidewalls, not unlike the first recess sidewalls 245 of the first recess, that extend between the protruding surface 250 and the first cabin floor surface 165. The protrusion 220 can have a width $W_{1P}$ as measured between the points, along the x-axis, where the protruding surface 250 intersects with the first cabin floor surface 165. The width $W_{1P}$ can have a value between 2 mm and 2 feet.

The protrusion 220, when viewed in a direction normal to the first cabin floor surface 165 (e.g., along the z-axis) can have various shapes such as circular, oval, rectangular, regular or irregular polygonal, etc. In instances where the protrusion 220 includes sidewalls, the number, size, and shape of the sidewalls can depend upon the geometry of the protruding surface 250. The protrusion 220 can be a rib that extends along the first cabin floor surface 165, say, for example, at least in the direction of the y-axis of the Cartesian reference frame 104. The first cabin floor surface 165 can include additional protrusions similar to the protrusion 220. The additional protrusions can have the value of at least one dimension different from the value of the corresponding dimension of the protrusion 220. The position of the protrusion 220 can be different from that shown in FIG. 2. That is, while FIG. 2 shows the protrusion 220 positioned between the first recess 215 and the second recess 225, the protrusion 220 can be positioned anywhere on the first cabin floor surface 165.

The cabin floor 155 can also include the pillar 210. The pillar 210 can extend out of the first cabin floor surface 165. For example, the pillar 210 can include a pillar surface 260 the plane of which is offset from the plane of the first cabin floor surface 165. The pillar surface 260 can be offset from the first cabin floor surface 165 in a direction towards the battery pack 115. A distance between the pillar surface 260 and the first cabin floor surface 163 is denoted by $D_P$. In some examples, the distance $D_P$ can range from a thickness of the stiffener 105 to a sum of the thicknesses of the stiffener 105 and the battery pack 115. In some examples, the distance $D_P$ can have a value between 2 mm and 65 cm. The pillar 210 can define an aperture 265 (or any other fastener receiving structure) that can receive a bolt 270, which also passes through an aperture in the battery pack 115. The bolt 270 can be coupled to a nut 275, which secures the bolt 270 against the pillar 210. The bolt 270 and the nut 275 can couple the battery pack 115 to the pillar 210. Other fasteners such as clamps, joints, rivets, screws, and welds may also be used to couple the battery pack 115 to the pillar 210. The pillar 210 can be positioned adjacent the first cabin frame side rail 180. The pillar 210 can be fastened to the first cabin frame side rail 180 using fasteners such as bolts, clamps, joints, rivets, screws, and welds.

The cabin floor 155 can include more than one pillar 210. For example, the cabin floor 155 can include at least one more pillar positioned adjacent the second cabin frame side rail 185. The cabin floor 155 can include additional pillars at locations that correspond to locations on the battery pack 115, when the battery pack is positioned against the cabin floor 155, that have fastener receiving structures. As an example, the cabin floor 155 can include at least four pillars positioned on the cabin floor 155 to correspond to the four corners of the battery pack 115.

A space between the battery pack 115 and the pillar 210 can be devoid of the stiffener 105. The first battery pack surface 280 of the battery pack 115 faces the pillar surface 260, and the space between the first battery pack surface 280 and the pillar surface 260 is devoid of the stiffener 105. This allows the battery pack 115 to be directly secured to the cabin floor 155 without an intervening material such as a stiffener 105. In some examples, the first battery pack surface 280 can abut the pillar surface 260. A material different than that used in the stiffener 105 can be positioned between the battery pack and the pillar 210. For example, a washer, a cushion, or other protective material can be positioned between the pillar 210 and the battery pack 115.

The central rib 230 can include a rib surface 285 that is raised in relation to the first cabin floor surface 165. The plane of the rib surface 285 can be offset from the plane of the first cabin floor surface 165 by a distance $D_{rib}$ which can range from a thickness of the stiffener 105 to a sum of the thicknesses of the stiffener 105 and the battery pack 115. In some examples, the distance $D_{rib}$ can have a value between 2 mm and 65 cm. The rib surface 285 can be flat or planar. The rib surface 285 can be a curved surface. The rib surface 285 can also include at least one portion that is flat or planar, and another portion that is curved. One or more central rib sidewalls 290 can extend between the rib surface 285 and the first cabin floor surface 165. The central rib sidewalls 290 can be flat or linear. The central rib sidewalls 290 can be curved. In some instances, the central rib sidewalls 290 can have at least one portion that is flat or linear, and at least another portion that is curved. The central rib 230 can extend along at least a portion of the cabin floor 155 between an end of the cabin floor 155 adjacent the front structure 120 (FIG. 1) and another end adjacent the rear structure 160 (FIG. 1) of the chassis 108. As an example, the central rib 230 can extend along the complete length of the cabin floor 155 between the front structure 120 and the rear structure 160. In some examples, the central rib 230 can be continuous between its ends. In some examples, the central rib 230 can be instead be discontinuous.

The central rib 230 can be positioned on the cabin floor 155 between the first cabin frame side rail 180 and the second cabin frame side rail 185. In some instances, the central rib 230 can be positioned equidistant from the first cabin frame side rail 180 and the second cabin frame side rail 185. In some instances, the central rib 230 can be positioned within 5% to 10% of being equidistant from the first cabin frame side rail 180 and the second cabin frame side rail 185. The first stiffener 105 can be positioned on one side of the central rib 230, and the second stiffener 110 can be positioned on the other side of the central rib 230. The first stiffener 105 can be positioned between the central rib 230 and the first cabin frame side rail 180, while the second stiffener 110 can be positioned between the central rib 230 and the second cabin frame side rail 185. While FIG. 2 shows only a portion of the cabin floor 155, it is understood that the portion the cabin floor 155 between the central rib 230 and the second cabin frame side rail 185 can have feature similar to those discussed above in relation to the portion of the cabin floor 155 between the central rib 230 and the first cabin frame side rail 180. For example, the portion of the cabin floor 155 between the central rib 230 and the second cabin frame side rail 185 can include one or more recesses similar to the first and the second recesses 215 and 225, one or more protrusions similar to the protrusion 220, and one or more pillars similar to the pillar 210. In some examples, the cabin floor 155 can be symmetric along an axis that extends along the length of the central rib 230. In some examples, the cabin floor 155 can be asymmetric along the axis.

The central rib 230 can define an aperture 295 (or any other fastener receiving structure) that can receive a bolt 202, which also passes through an aperture in the battery pack 115. The bolt 202 can be coupled to a nut 204, which secures the bolt 202 against the central rib 230. The bolt 202 and the nut 204 can couple the battery pack 115 to the central rib 230. Other fasteners such as clamps, joints, rivets, screws, and welds may also be used to couple the battery pack 115 to the central rib 230. The central rib 230 can include additional apertures or fastener receiving structures that can allow coupling the battery pack 115 to the central rib 230. The battery pack 115 can be coupled to the cabin floor 155 at locations other than the pillars and the central rib 230.

A space between the battery pack 115 and the central rib 230 can be devoid of the stiffener 105. The first battery pack surface 280 of the battery pack 115 faces the rib surface 285, and the space between the first battery pack surface 280 and the rib surface 285 can be devoid of the stiffener 105. This allows the battery pack 115 to be directly secured to the cabin floor 155 without an intervening material such as a stiffener 105. In some examples, the first battery pack surface 280 can abut the rib surface 285. A material different than that used in the stiffener 105 can be positioned between the battery pack 115 and the central rib 230. For example, a washer, a cushion, or other protective material can be positioned between the central rib 230 and the battery pack 115.

The battery pack 115 can include the first battery pack surface 280 facing the first cabin floor surface 165 and a second battery pack surface 195 facing away from the first cabin floor surface 165. The battery pack 115 can include a battery pack recess 206 that defines a volume 208 in the in the first battery pack surface 280. The battery pack recess 206 can include a battery pack recessed surface 212 that is offset from the first battery pack surface 280. The battery pack recessed surface 212 can be flat or planar. The battery pack recessed surface 212 can also be curved or have at least one portion that is flat and at least another portion that is curved. The battery pack recessed surface 212 can be offset from the first battery pack surface 280 by a distance $D_{2R}$, which can have a value between 2 mm and a thickness of the battery pack 115 (such as, for example, 6 inches to 18 inches). Sidewalls can extend between the battery pack recessed surface 212 and the first battery pack surface 280. A distance between the sidewalls, representing a width $W_{2R}$, can have a value between 2 mm and 2 feet.

The battery pack recessed surface 212, when viewed in a direction normal to the first battery pack surface 280 (e.g., along the z-axis) can have various shapes such as circular, oval, rectangular, regular or irregular polygonal, etc. The sidewalls can extend between the perimeter of the battery pack recessed surface 212 and the first battery pack surface 280. In such examples, the battery pack recess 206 can also include a dimension along the y-axis. The volume 208 can be a volume bounded by the battery pack recessed surface 212 and the sidewalls extending between the battery pack recessed surface 212 and the first battery pack surface 280. In some examples, the battery pack recess 206 can be a channel formed in the battery pack 115, and can extend along the first battery pack surface 280.

The first battery pack surface 280 can include additional recesses in the first battery pack surface 280. The additional recesses can be similar in shape and size to the battery pack recess 206. The additional recesses may have at least one dimension with a value that is different form a value of a corresponding dimension of the battery pack recess 206. The first battery pack surface 280 may also define one or more protrusions that extend out of the first battery pack surface 280 in the direction opposite to the direction of the second battery pack surface 195.

The first stiffener 105 and the second stiffener 110 can be disposed between the battery pack 115 and the cabin floor 155. The first stiffener 105 can include a first stiffener surface 214 that faces the first cabin floor surface 165, and a second stiffener surface 216 facing the first battery pack surface 280. The second stiffener surface 216 can be opposite to the first stiffener surface 214. A first sidewall 218 and a second sidewall 222 can extend between the first stiffener surface 214 and the second stiffener surface 216. The first sidewall 218 can be adjacent the pillar 210 of the cabin floor 155, while the second sidewall 222 can be adjacent the central rib 230 of the cabin floor 155. The first sidewall 218 and the second sidewall 222 can be flat or planar. The first sidewall 218 and the second sidewall 222 can be curved. Any one or both of the first sidewall 218 and the second sidewall 222 can include at least one portion that is flat or planar, and at least another portion that is curved.

The first stiffener 105 can include several stiffener elements that align with the recesses and protrusions formed on the cabin floor 155 and on the battery pack 115. For example, the first stiffener 105 can include a first stiffener element 224 that extends out of the first stiffener surface 214 can conforms to a shape of the first recess 215. The first stiffener element 224 can be a protrusion that extends out of the plane of the first stiffener surface 214 and has a shape that corresponds to the shape of the first recess 215 such that when the first stiffener element 224 is positioned within the first recess 215, the first stiffener element 224 conforms to the shape of the first recess 215. The first stiffener element 224 can include a first stiffener element surface 226 that is raised in relation to the first stiffener surface 214. The first stiffener element surface 226 can be flat or planar. The first stiffener element surface 226 can be curved. The first stiffener element surface 226 can include at least one portion that is flat or planar, an at least another portion that is curved. The first stiffener element surface 226 can have a shape that conforms to the shape of the first recessed surface 240. The first stiffener element 224 can include first stiffener element sidewalls 228 that extend between the first stiffener surface 214 and the first stiffener element surface 226. The first stiffener element sidewalls 228 can be flat or linear. The first stiffener element sidewalls 228 can be curved. The first stiffener element sidewalls 228 can include at least one portion that is flat or linear, and at least one portion that is curved. The shape and size of the first stiffener element sidewalls 228 can conform to the shape and size of the first recess sidewalls 245.

The first stiffener element surface 226 can be offset from the first stiffener surface 214 by a distance denoted by $D_{1E}$, which can have a value between 0.5 mm and 50 mm. The distance $D_{1E}$ can be less than or equal to the distance $D_{1R}$ between the first recessed surface 240 and the first cabin floor surface 165. Having $D_{1E}$ equal to $D_{1R}$ can result in the first stiffener element surface 226 to be in contact with the first recessed surface 240 while having the first stiffener surface 214 be in contact with the first cabin floor surface 165. In some instances, the distance $D_{1E}$ can less than $D_{1R}$ to accommodate for insertion of additional substances, such as an adhesive, between the first recessed surface 240 and the first stiffener element surface 226. The first stiffener element sidewalls 228 can be spaced apart by a distance denoted by $W_{1E}$, which can have a value between 2 mm and 2 feet. The distance $W_{1E}$ can be equal to the distance $W_{1R}$ between the first recess sidewalls 245 of the first recess 215. In some instances, the distance $W_{1E}$ between the first stiffener element sidewalls 228 can be less than the distance $W_{1R}$ between the first recess sidewalls 245 of the first recess 215 to allow ease in insertion of the first stiffener element into the first recess 215. The distance may be smaller to also accommodate insertion of additional substances, such as adhesive, between the first recess sidewalls 245 of the first recess 215 and the first stiffener element sidewalls 228.

The first stiffener element 224 can be aligned with the first recess 215. The position of the first stiffener element 224 on the first stiffener surface 214 can align with the position of the first recess 215 on the first cabin floor surface 165 when the first stiffener 105 is positioned over the first cabin floor surface 165. For example, a distance between the first recess 215 and the central rib 230 along the x-axis of the Cartesian reference frame 104 can be equal to a distance between the first stiffener element 224 and the second sidewall 222, which abuts the central rib 230.

The first stiffener 105 also can include the second stiffener element 232 that extends into the first stiffener surface 214 and conforms to the shape of the protrusion 220 in the first cabin floor surface 165. The second stiffener element 232 can include a second stiffener element surface 234 that has a shape and size that conforms with the shape of the protruding surface 250 of the protrusion 220. The second stiffener element surface 234 can extend into the first stiffener surface 214 normal to the plane of the first stiffener surface 214. An extent to which the second stiffener element surface 234 extends normal to the plane of the first stiffener surface 214 can be denoted by a distance $D_{2E}$, which can have values between 1 mm and 50 mm. In some instances, the distance $D_{2E}$ can be equal to the distance $D_{1P}$ denoting the extent to which the protruding surface 250 extends from the first cabin floor surface 165. The distance $D_{2E}$ may be greater than the distance $D_{1P}$ in instances where additional substances, like an adhesive, are to be accommodated between the protrusion 220 and the second stiffener element 232. The second stiffener element 232 can have a width $W_{2E}$ as measured between the points, along the x-axis, where the second stiffener element surface 234 intersects with the first stiffener surface 214. The width $W_{2E}$ can have a value 2 mm and 2 feet. The width $W_{2E}$ can be equal to or greater than the width $W_{1P}$ of the protrusion 220 to accommodate the protrusion 220 within the second stiffener element 232.

The position of the second stiffener element 232 on the first stiffener surface 214 can be such that when the first stiffener 105 is positioned between the cabin floor 155 and the battery pack 115, the second stiffener element 232 aligns with the position of the protrusion 220. As an example, the second stiffener element 232 can be positioned on the first stiffener surface 214 a certain distance (along the x-axis) from the first stiffener element 224 that is equal to a distance (along the x-axis) between the first recess 215 and the protrusion 220. Thus, when the first stiffener 105 is positioned over the first cabin floor surface 165, the first stiffener element 224 and the second stiffener element 232 can align with the first recess 215 and the protrusion 220, respectively.

The first stiffener 105 can include additional stiffener elements that correspond to other features in the cabin floor 155. For example, the first stiffener 105 can include a third stiffener element 242 that conforms to a shape of a volume defined by the second recess 225 formed on the first cabin floor surface 165. The third stiffener element 242 can be positioned on the first stiffener surface 214 such that when the first stiffener 105 is positioned over the first cabin floor surface 165, the third stiffener element 242 aligns with the second recess 225.

The first stiffener 105 also can include additional stiffener elements that correspond to features on the first battery pack surface 280. For example, the first stiffener 105 can include a third stiffener element 244 that extends out of the second stiffener surface 216. The third stiffener element 244 can conform to a shape of the battery pack recess 206 that defines the volume 208 in the in the first battery pack surface 280. The third stiffener element can include a third stiffener element surface 246 that is raised in relation to the second stiffener surface 216. The extent to which the third stiffener element surface 246 extends from the second stiffener surface 216 can be denoted by $D_{3E}$, which can have a value 1 mm and a thickness of the battery pack 115 (such as, for example, 6 inches to 18 inches). The distance $D_{3E}$ can be equal to the distance $D_{2R}$ between the battery pack recessed surface 212 and the first battery pack surface 280 such that the second stiffener surface 216 and the third stiffener element 244 are simultaneously in contact with the first battery pack surface 280 and the battery pack recessed surface 212, respectively. The distance $D_{3E}$ can be greater than the distance $D_{2R}$ to accommodate inclusion of one or more substances, such as an adhesive, or a cushioning or protecting material (such as soft foam, rubber, plastic) that can be disposed between the second stiffener surface 216 and the first battery pack surface 280. The third stiffener element 244 can also include sidewalls that extend between the third stiffener element surface 246 and the second stiffener surface 216.

A width of the third stiffener element 244 measured between the sidewalls along the x-axis can be denoted by $W_{3E}$, which can have a value between 1 mm and 2 feet. In some instances, the width $W_{3E}$ of the third stiffener element 244 can be equal to the width $W_{2R}$ of the battery pack recess 206. The width $W_{3E}$ can be less than the width $W_{2R}$ to allow the third stiffener element 244 to easily insert into the battery pack recess 206. The width $W_{3E}$ can be less than the width $W_{2R}$ to accommodate additional substances, such as an adhesive, or a cushioning or protecting material (such as soft foam, rubber, plastic) between the first battery pack surface 280 and the second stiffener surface 216. The shape of the third stiffener element 244 can conform to the shape of the battery pack recess 206. For example, the third stiffener element surface 246 can have a shape that conforms to the shape of the battery pack recessed surface 212. The third stiffener element can be aligned with the battery pack recess 206. The third stiffener element 244 can be positioned on the second stiffener surface 216 such that the third stiffener element 244 is aligned with the battery pack recess 206 when the first stiffener 105 is positioned between the cabin floor 155 and the battery pack 115.

The first stiffener 105 can include additional stiffener elements, similar to the third stiffener element 244, on the second stiffener surface 216 with positions corresponding to the positions of other battery pack recesses formed on the first battery pack surface 280. The first stiffener 105 also can include stiffener elements that includes recesses that can align with protrusions extending from the first battery pack surface 280. These shapes and sizes of the additional stiffener elements can be similar to the shapes and sizes of their correspondingly positioned recesses or protrusions in the first battery pack surface 280.

The first stiffener surface 214 can be in direct contact with the first cabin floor surface 165. However, due to tolerances involved in the manufacturing of the cabin floor 155 and the stiffener 105/110, there may be gaps between the first stiffener surface 214 and the first cabin floor surface 165 at some locations. The gap between the first stiffener surface 214 and the first cabin floor surface 165 can range between 0 mm and 10 mm. Similarly, the gap between the second stiffener surface 216 and the first battery pack surface 280 can have a value between 0 mm and 10 mm.

A thickness of the stiffener 105/110 can be measured as a distance between the first stiffener surface 214 and the second stiffener surface 216. However, due to the presence of various stiffener elements on each of these surfaces, the thickness of the stiffener 105/110 may be non-uniform and a function of the location where the thickness is measured. As an example, the thickness of the stiffener 105/110 can have a value between 5 mm and 30 mm. The thickness of the stiffener 105/110 can also be the function of the distance between the first cabin floor surface 165 of the cabin floor 155 and the first battery pack surface 280 of the battery pack 115. In particular, the distances between these two surfaces can vary based on the recesses and protrusions in each of these surfaces. The stiffener 105/110 can be shaped and sized to fill in the space between the first cabin floor surface 165 and the first battery pack surface 280, and therefore, the thickness of the stiffener 105/110 can be a function of the distance between the first cabin floor surface 165 and the first battery pack surface 280 at various locations taking into consideration the recesses and protrusions in these surfaces.

An adhesive layer 256 can be disposed between the first cabin floor surface 165 and the first stiffener surface 214. The adhesive can provide binding between the stiffener 105/110 and the cabin floor 155. The binding can further improve the stiffness of the cabin floor 155. The adhesive can be a glue, cement, mucilage or paste. The adhesive layer 256 can include solvent based adhesives, polymer dispersion adhesives, pressure-sensitive adhesives, contact adhesives, multi-component adhesives, pre-mixed adhesives, ultraviolet light curing adhesives, etc. The adhesive can be applied either to the first cabin floor surface 165, or the first stiffener surface 214, or both prior to positioning the stiffener 105/110 over the first cabin floor surface 165.

Figure 3:
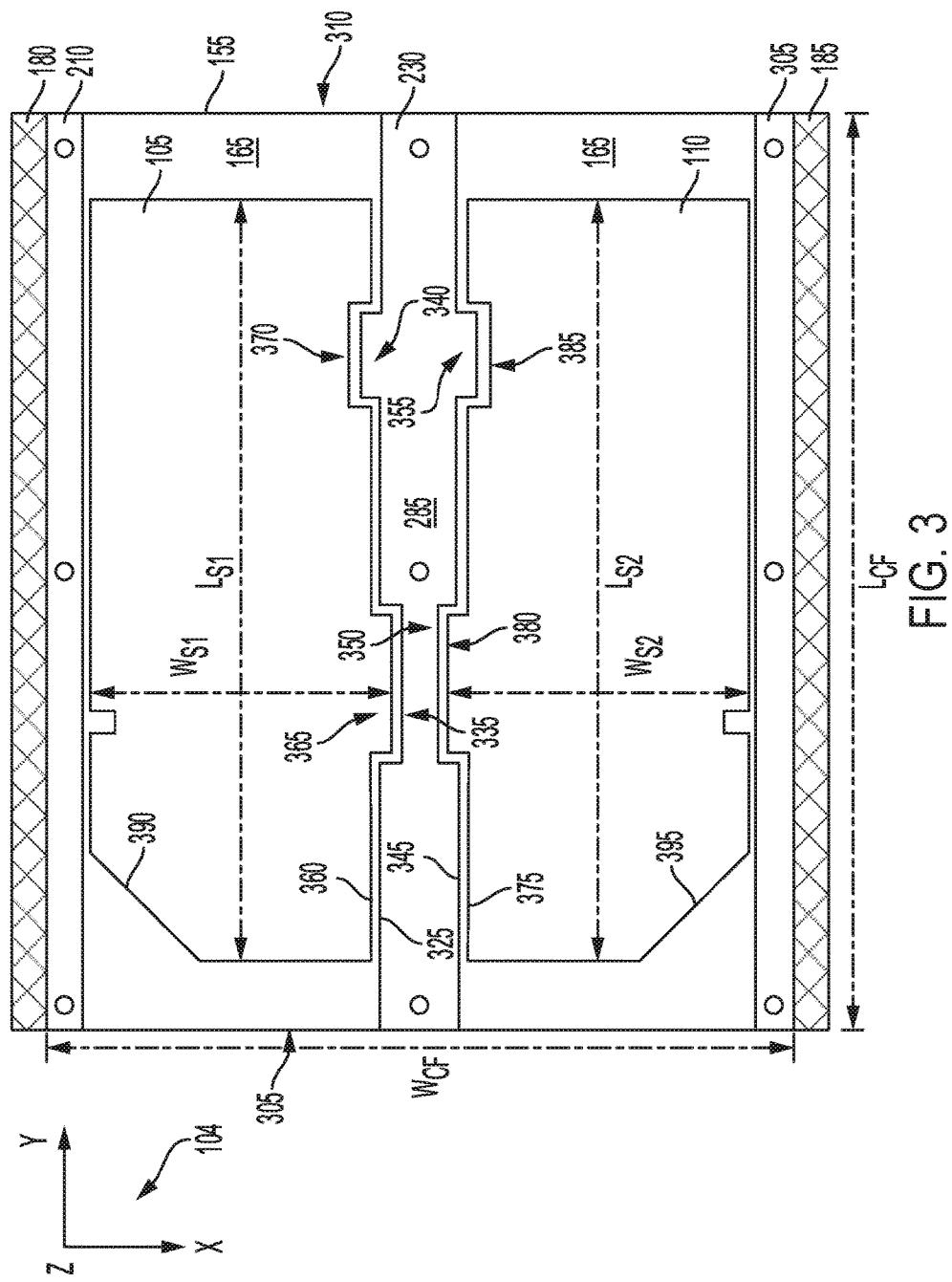
FIG. 3 shows a bottom view of the cabin floor including the first stiffener and the second stiffener shown in FIG. 1.

FIG. 3 shows a bottom view of the cabin floor 155 including the first stiffener 105 and the second stiffener 110 shown in FIG. 1. The bottom view of the cabin floor 155 shows the first cabin floor surface 165 which is partially covered by the first stiffener 105 and the second stiffener 110. The cabin floor 155 extends between the first cabin frame side rail 180 and the second cabin frame side rail 185. The cabin floor 155 also extends between a first cabin floor end 305, adjacent the front structure 120 (FIG. 1) and a second cabin floor end 310 adjacent the rear structure 160 (FIG. 1). The length $L_{CF}$ of the cabin floor 155 can be measured as a distance between the first cabin floor end 305 and the second cabin floor end 310 and can have a value between 80 inches to 120 inches. The cabin floor 155 can have a width $W_{CF}$, measured between the first cabin frame side rail 180 and the second cabin frame side rail 185, can have a value between 40 inches to 120 inches. The central rib 230 extends continuously between the first cabin floor end 305 and the second cabin floor end 310. In some examples, the central rib 230 can be discontinuous between the first cabin floor end 305 and the second cabin floor end 310. The cabin floor 155 also includes a first pillar 315 adjacent the first cabin frame side rail 180 and a second pillar 320 adjacent the second cabin frame side rail 185. The first and second pillars 313 and 320 can be similar to the pillar 210 discussed above in relation to FIG. 2.

The first stiffener 105 can be positioned over the first cabin floor surface 165 and between the central rib 230 and the first cabin frame side rail 180, while the second stiffener 110 can be positioned over the first cabin floor surface 165 and between the central rib 230 and the second cabin frame side rail 185. The central rib 230 can include a first central rib sidewall 325 and an opposing second central rib sidewall 345 that extend between the rib surface 285 and the first cabin floor surface 165. The sidewalls of the central rib 230 can have features to which the sidewalls of the adjacent stiffener can conform. For example, the first central rib sidewall 325 can include a first central rib recess 335 and a first central rib protrusion 340, while the second central rib sidewall 345 can include a second central rib recess 350 and a second central rib protrusion 355. The first stiffener 105 can include a first sidewall 360 that faces the first central rib sidewall 325 and includes a first stiffener sidewall element 365 and a second stiffener sidewall element 370. The shape and size of the first stiffener sidewall element 365 can conform to the shape and size of the first central rib recess 335, and the shape and size of the second stiffener sidewall element 370 can conform to the shape and size of the first central rib protrusion 340. The second stiffener 110 can include a second sidewall 375 that faces the second central rib sidewall 345 and includes a third stiffener sidewall element 380 and a fourth stiffener sidewall element 385. The shape and size of the third stiffener sidewall element 380 can conform to the shape and size of the second central rib recess 350. The shape and size of the fourth stiffener sidewall element 385 can conform to the shape and size of the second central rib protrusion 355.

The first stiffener 105 can have a length $L_{S1}$ and a width $W_{S1}$. The length $L_{S1}$ can have a value between 2 mm and 2% of the length of the cabin floor 155, and the width $W_{S1}$ can have a value between 2 mm and 2% of the cabin floor 155. The length $L_{S1}$ can be measured along a longitudinal axis of the cabin floor 155, such as, for example, along the y-axis of the Cartesian reference frame 104. The length $L_{S1}$ and width $W_{S1}$ may vary based on the location of measurement due to the various features on the sidewalls along the perimeter of the first stiffener 105. In some examples, the length $L_{S1}$ and width $W_{S1}$ can represent the maximum length and the maximum width, respectively, of the first stiffener. The second stiffener 110 can also have a length $L_{S2}$ and a width $W_{S2}$, which can be measured along the same dimensions as the measurement of the length $L_{S1}$ and width $W_{S1}$ of the first stiffener 105. In some examples, at least one of the length $L_{S1}$ and width $W_{S1}$ of the first stiffener 105 can be equal to the length $L_{S2}$ and the width $W_{S2}$, respectively, of the second stiffener 110.

At least one dimension of the stiffener 105/110 can be equal to a corresponding dimension of the battery pack 115. For example, the length $L_{S1}$ and length $L_{S2}$ of the first stiffener 105 and the second stiffener 110 can have a value that is equal to the length of the battery pack 115 in the same dimension. In some instance, such as where the cabin floor 155 does not include a central rib 230, a width of a stiffener positioned between the cabin floor 155 and the battery pack 115 can have a width that is equal to the width, in the same dimension, of the battery pack 115.

The first stiffener 105 and the second stiffener 110 can include additional features, such as angled, beveled, or chamfered corners. For example, the first stiffener 105 can include a first angled sidewall 390 that forms a non-perpendicular angle with a sidewall at each of its ends. Similarly, the second stiffener 110 can include a second angled sidewall 395 that forms a non-perpendicular angle with a sidewall at each of its ends. The first and the second sidewalls can have an angled orientation to conform to the shape and features of the cabin floor 155. In some examples, the first and second angled sidewalls 390 and 395 can form any angle that is less than 90 degrees or greater than 90 degrees. The first stiffener 105 and the second stiffener 110 can include more than one angled, beveled, or chamfered sidewalls. In some examples, the first stiffener 105 and the second stiffener 110 can include sidewalls that only intersect at 90 degree angles. The stiffeners 105/110 can have any shape, such as a regular shape, irregular shape, symmetrical shape, asymmetrical shape, polygonal shape (regular or irregular), and curved shape.

Figure 4:
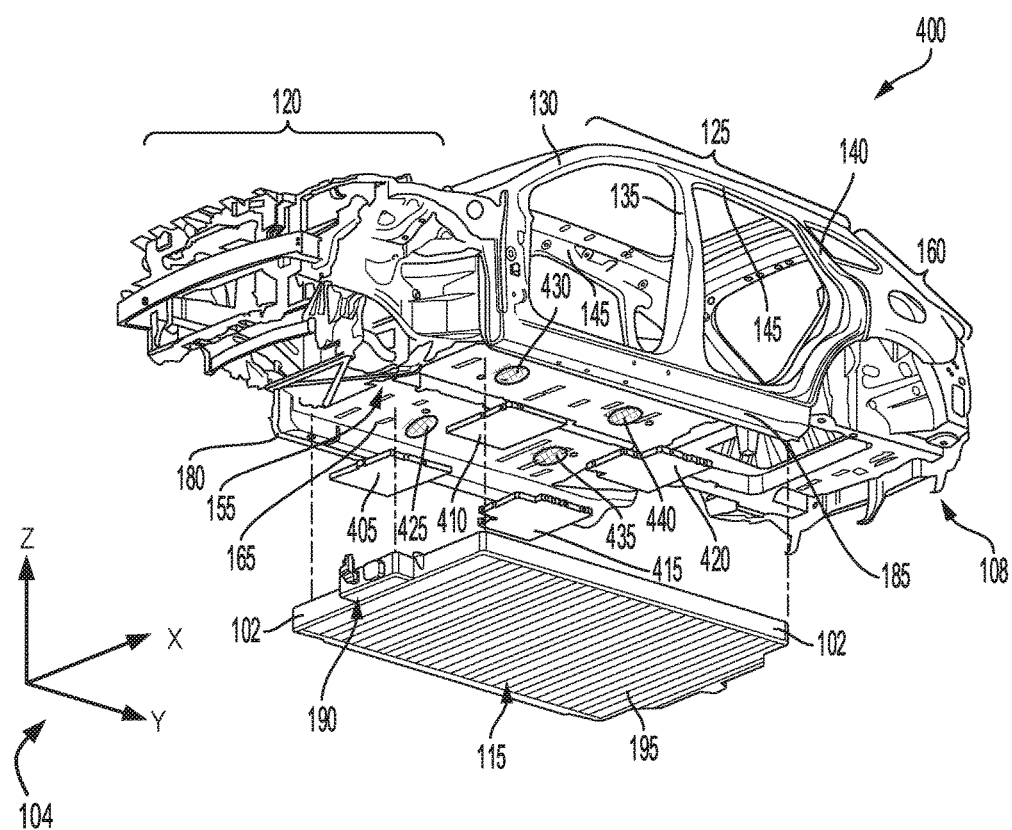
FIG. 4 shows an isometric view of a system of an electric vehicle including at least one stiffener.

FIG. 4 shows an isometric view of a system 400 of an electric vehicle including at least one stiffener. In particular, the system 400 includes more than two stiffeners that are positioned over vibrations hotspots identified in the cabin floor. FIG. 4 shows the chassis 108 similar to the chassis 108 and a battery pack 115 similar to the chassis 108 and the battery pack 115 shown in FIG. 1. The system 400 includes four stiffeners: a first stiffener 405, a second stiffener 410, a third stiffener 415, and a fourth stiffener 420. The four stiffeners 405-420 can be located at specific locations under the second cabin floor surface 205. For example, areas on the cabin floor 155 that can experience vibrations over a certain threshold ("vibration hotspots") can be identified. FIG. 4 shows four vibrations hotspots: a first vibration hotspot 425, a second vibration hotspot 430, a third vibration hotspot 435, and a fourth vibration hotspot 440. The four stiffeners 405-420 can be positioned over the four vibration hotspots 425-440 (or 425, 430, 435, 440). The four vibration hotspots 425-440 can be identified by simulation of the mechanical response of the cabin floor 155 to vehicle operation. In some examples, the four vibration hotspots 425-440 can be identified by field testing the electric vehicle and using vibration sensors positioned throughout the cabin floor 155. The data form the vibration sensor can be processed to determine the locations on the cabin floor 155 that exhibit vibrations having magnitudes greater than a threshold value. In some examples, the vibrations can be measured in MPa units and can denote the predicted sound pressure that is expected to originate from various locations on the cabin floor 155. The vibrations may also be measured in equivalent radiated power (ERP) which can be a function of a square of a velocity of a portion of the cabin floor 155 multiplied by the area of the portion of the cabin floor 155, and can have units of $(m/s)^2 \cdot m^2$. In some examples, vibrations may also be measured in terms of the acoustic noise generated by a portion of the cabin floor 155 and can be expressed in decibels.

As shown in FIG. 4, the first vibration hotspot 425 and the third vibration hotspot 435 are positioned between the central rib 230 and the first cabin frame side rail 180, and the second vibration hotspot 430 and the fourth vibration hotspot 440 are positioned between the central rib 230 and the second cabin frame side rail 185. The first vibration hotspot 425 and the second vibration hotspot 430 are positioned on the cabin floor 155 closer to the front structure 120 than to the rear structure 160, while the third vibration hotspot 435 and the fourth vibration hotspot 440 are positioned on the cabin floor 155 closer to the rear structure 160 than to the front structure 120. However, the positions and the number of the hotspots shown in FIG. 4 is only an example. Actual implementations can result in vibration hotspots that appear in positions different from the ones shown in FIG. 4. Additionally, actual implementations can result in a number of vibration hotspots different from the four shown in FIG. 4. In some example, a model of the cabin floor 155 can be analyzed using structural analysis tools to determine the location, size, and shape of the vibration hotspots. As an example, structural analysis software, such as SAP2000® can be utilized for carrying out simulations on models of the cabin floor 155 to determine the location, size, and shape of the vibration hotspots. An example values of a dimension (length of breadth) of the vibrations hotspots can be between 1 mm and up to the value of the corresponding dimension of the cabin floor The four stiffeners 405-420 can be positioned over the four vibration hotspots 425-440. In particular, the first stiffener 405 can be positioned over the first vibration hotspot 425, the second stiffener 410 can be positioned over the second vibration hotspot 430, the third stiffener 415 can be positioned over the third vibration hotspot 435, and the fourth stiffener 420 can be positioned over the fourth vibration hotspot 440. As an example, the number of stiffeners can be equal to the number of vibration hotspots. In some examples, depending upon the size of the vibration hotspots, one stiffener can cover more than one vibration hotspots. Therefore, the number of stiffeners can be less than the number of vibration hotspots.

Each of the four stiffeners 405-420 can include a first stiffener surface that faces the first cabin floor surface 165 and a second stiffener surface that faces the first battery pack surface 280. In addition, the first stiffener surface can include a first stiffener element that extends out of the first stiffener surface and conforms to a shape of a recess that defines a volume in the cabin floor 155. The first stiffener surface can be similar to the first stiffener surface 214 discussed above in relation to FIG. 2, and can include stiffener elements such as the first stiffener element 224, the second stiffener element 232 and a third stiffener element 244 discussed above in relation to FIG. 2. The stiffener elements in the first stiffener surface of each of the four stiffeners 405-420 can be aligned to the corresponding feature in the cabin floor 155. Further, each of the four stiffeners 405-420 can include a second stiffener surface that faces the battery pack 115 similar to the second stiffener surface 216 discussed above in relation to FIG. 2. The second stiffener surface can include one or more stiffener elements that align with the corresponding recesses or protrusions on the first battery pack surface 280 of the battery pack 115.

Surface area of each of the four stiffeners 405-420 can be greater than the surface area of the corresponding vibration hotspot. The surface area of a stiffener can be equal to the surface area within the perimeter of the stiffener when viewed in a direction normal to the first surface or the second surface of the stiffener. The first surface can be similar to the first stiffener surface 214 and the second surface can be similar to the second stiffener surface 216 shown in FIG. 2. The surface area of the stiffener can be at least X % greater than the surface area of the corresponding vibration hotspot, where X can have a value between 50% and 200%. In some examples, the position and size of the stiffener in relation to the shape and size of the corresponding vibration hotspot can be such that the perimeter of the stiffener completely covers the perimeter of the vibration hotspot. In addition, when positioned over the vibration hotspot on the cabin floor 155, the perimeter of the stiffener can not only cover the area within the perimeter of the corresponding vibration hotspot, but also an area within a clearance boundary around the perimeter of the vibration hotspot. In some examples, a minimum distance between the clearance boundary and the perimeter of the vibration hotspot can have a value between 50% to 200% of a dimension of the vibration hotspot.

The first and second stiffeners 105 and 110 shown in FIGS. 1-3 and the four stiffeners 405-420 shown in FIG. 4 can improve the rigidity and the stiffness of the cabin floor 155 thereby reducing the vibrations in the cabin floor 155 and reducing the audible noise caused by those vibrations. The stiffeners can be press-fit between the stiff battery pack 115 and the cabin floor 155, thereby allowing the combined stiffness of the battery pack 115 and the stiffener to contribute to the overall stiffness of the cabin floor 155. In some examples, using the stiffeners discussed herein can result in a two-fold improvement in the reduction of audible noise caused by the cabin floor 155 compared to approaches that utilize sound deadening materials, such as liquid applied sound deadening (LASD) on the cabin floor 155, inside the cabin 125 or utilize a soft foam material (such as, e.g., PORON®) positioned between the cabin floor 155 and the battery pack 115. Moreover, the stiffener discussed herein is substantially lighter than LASD material or the soft-foam material. Therefore, the use of the stiffener has a relatively lower impact on the overall weight of the vehicle, which results in a relatively lower impact on the fuel efficiency and performance of the vehicle.

Figure 5:
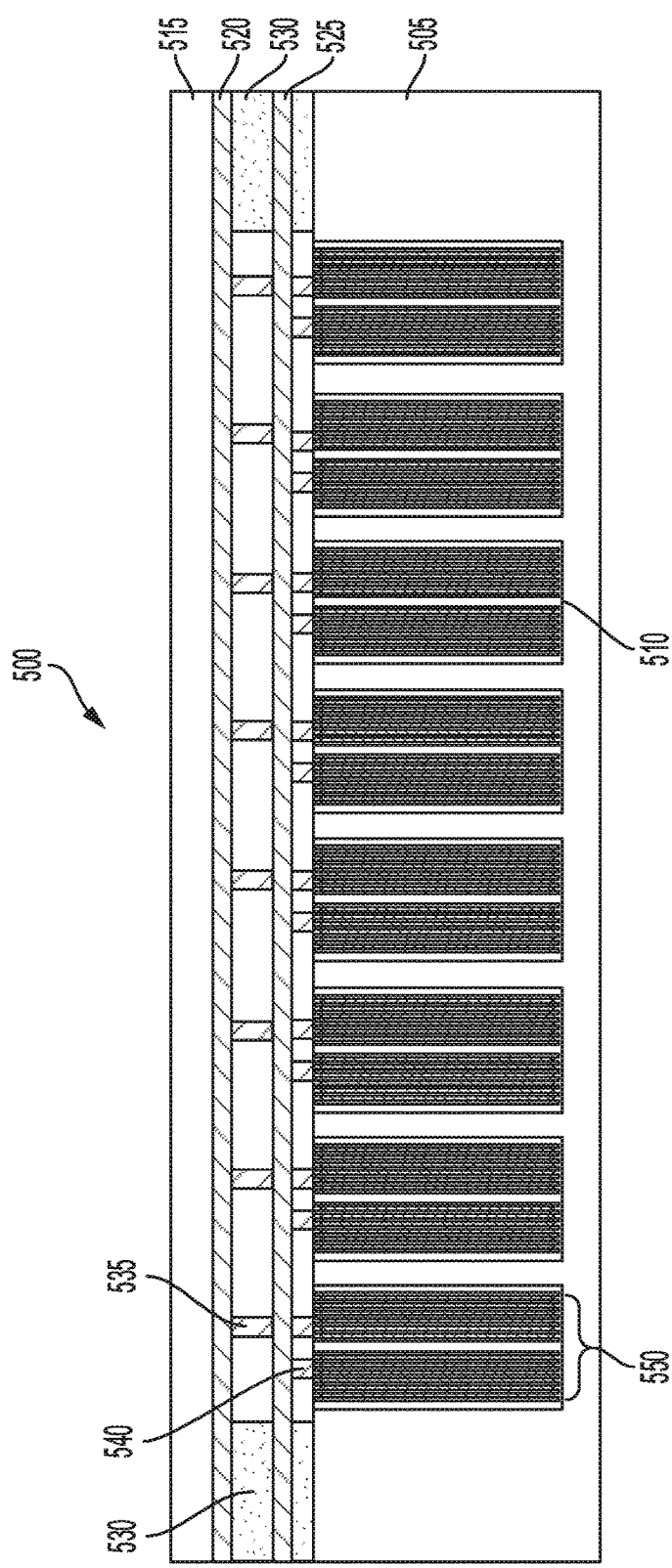
FIG. 5 depicts a cross-section view of a battery module to hold a set of battery cells in an electric vehicle.

FIG. 5 depicts a cross-section view of a battery module 500 to hold a set of battery cells 550 in an electric vehicle. The battery module 500 can be part of the system or apparatus 100 or 400. The battery module 500 can be of any shape. The shape of the battery module 500 can be cylindrical with a circular, elliptical, or ovular base, among others. The shape of the battery module 500 can also be prismatic with a polygonal base, such as a triangle, a square, a rectangle (e.g., as depicted), a pentagon, and a hexagon, among others. The battery module 500 can have a length ranging between 10 cm to 200 cm. The battery module 500 can have a width ranging between 10 cm to 200 cm. The battery module 500 can have a height ranging between 65 mm to 100 cm.

The battery module 500 can include at least one battery case 505 and a capping element 515. The battery case 505 can be separated from the capping element 515. The battery case 505 can include or define a set of holders 510. Each holder 510 can be or include a hollowing or a hollow portion defined by the battery case 505. Each holder 510 can house, contain, store, or hold a battery cell 550. The battery case 505 can include at least one electrically or thermally conductive material, or combinations thereof. Between the battery case 505 and the capping element 515, the battery module 500 can include at least one positive current collector 520, at least one negative current collector 525, and at least one electrically insulative layer 530. The positive current collector 520 and the negative current collector 525 can each include an electrically conductive material to provide electrical power to other electrical components in the electric vehicle. The positive current collector 520 (sometimes referred herein as a positive busbar) can be connected or otherwise electrically coupled with a positive conductive layer of each battery cell 550 housed in the set of holders 510 via a bonding element 535. One end of the bonding element 535 can be bonded, welded, connected, attached, or otherwise electrically coupled to a positive conductive layer of the battery cell 550. The negative current collector 525 (sometimes referred herein as a negative busbar) can be connected or otherwise electrically coupled with a negative conductive layer of each battery cell 550 housed in the set of holders 510 via a bonding element 540. The bonding element 540 can be bonded, welded, connected, attached, or otherwise electrically coupled to the negative conductive layer of the battery cell 550.

The positive current collector 520 and the negative current collector 525 can be separated from each other by the electrically insulative layer 530. The electrically insulative layer 530 can include spacing to pass or fit the positive bonding element 535 connected to the positive current collector 520 and the negative bonding element 540 is connected to the negative current collector 525. The electrically insulative layer 530 can partially or fully span the volume defined by the battery case 505 and the capping element 515. A top plane of the electrically insulative layer 530 can be in contact or be flush with a bottom plane of the capping element 515. A bottom plane of the electrically insulative layer 530 can be in contact or be flush with a top plane of the battery case 505. The electrically insulative layer 530 can include any electrically insulative material or dielectric material, such as air, nitrogen, sulfur hexafluoride ($SF_6$), ceramic, glass, and plastic (e.g., polysiloxane), among others to separate the positive current collector 520 from the negative current collector 525.

Figure 6:
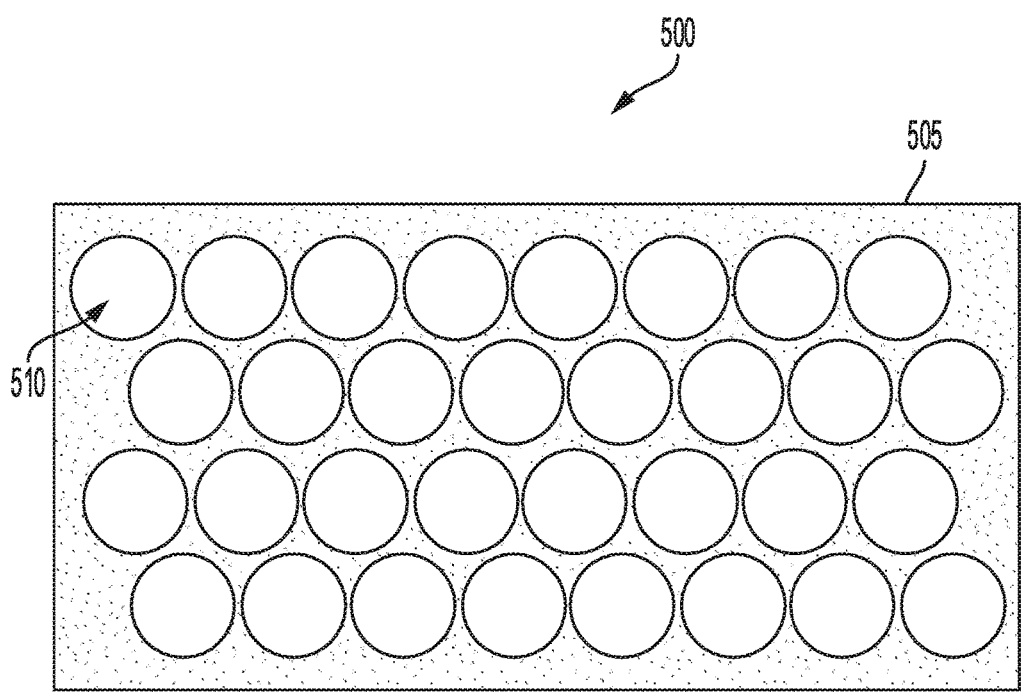
FIG. 6, among others, depicts a top-down view of a battery module to a hold a plurality of battery cells in an electric vehicle.

FIG. 6, among others, depicts a top-down view of a battery module 500 to a hold a plurality of battery cells 550 in an electric vehicle. The battery module 500 can define or include a set of holders 510. The shape of each holder 510 can match a shape of the housing of the battery cell 550. The shape of each holder 510 can be cylindrical with a circular (e.g., as depicted), elliptical, or ovular base, among others. The shape of each holder 510 can also be prismatic with a polygonal base, such as a triangle, a square, a rectangle, a pentagon, and a hexagon, among others. The shapes of each holder 510 can vary or can be uniform throughout the battery module 500. For example, some holders 510 can be hexagonal in shape, whereas other holders can be circular in shape. The dimensions of each holder 510 can be larger than the dimensions of the battery cell 550 housed therein. Each holder 510 can have a length ranging between 10 mm to 300 mm. Each holder 510 can have a width ranging between 10 mm to 300 mm. Each holder 510 can have a height (or depth) ranging between 65 mm to 100 cm.

Figure 7:
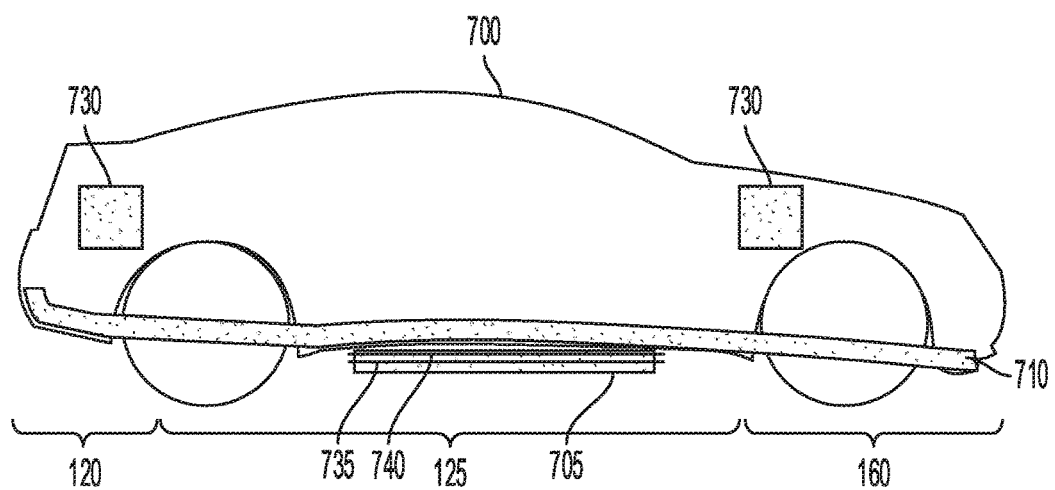
FIG. 7, among others, depicts a cross-section view of an electric vehicle installed with a battery pack.

FIG. 7, among others, depicts a cross-section view of an electric vehicle 700 installed with a battery pack 705. The apparatus to power the electric vehicle 700 can include at least one battery cell 550, at least one battery module 500, and at least one battery pack 705, including the components thereof. The battery pack can represent the battery pack 115 discussed above in relation to FIGS. 1-4. The battery pack 705 can include one or more than one battery modules 500, for example. The electric vehicle 700 can be an electric automobile (e.g., as depicted), hybrid, a motorcycle, a scooter, a passenger vehicle, a passenger or commercial truck, and another type of vehicle such as sea or air transport vehicles, a plane, a helicopter, a submarine, a boat, or a drone, among others. The electric vehicle 700 can include at least one battery pack 705. The battery pack 705 can house, contain, or otherwise include a set of battery modules 500. In one example, the number of battery modules 500 in the battery pack 705 can range between one to hundred. The battery pack 705 can be of any shape. The shape of battery pack 705 can be cylindrical with a circular, elliptical, or ovular base, among others. The shape of battery pack 705 can also be prismatic with a polygonal base, such as a triangle, a square, a rectangle (e.g., as depicted), a pentagon, and a hexagon, among others. The battery pack 705 can have a length ranging between 100 cm to 600 cm. The battery pack 705 can have a width ranging between 50 cm to 400 cm. The battery pack 705 can have a height ranging between 70 mm to 1000 mm.

The electric vehicle 700 can include at least one chassis 108 (e.g., a frame, internal frame, or support structure). The chassis 108 can support various components of the electric vehicle 700. The chassis 108 can span a front structure 120 (e.g., a hood or bonnet portion), a cabin 125, and a rear structure 160 (e.g., a trunk portion) of the electric vehicle 700. The battery pack 705 can be installed or placed below the chassis 108 under the cabin 125.

The electric vehicle 700 can include one or more components 730. The one or more components 730 can include an electric engine, an entertainment system (e.g., a radio, display screen, and sound system), on-board diagnostics system, and electric control units (ECUs) (e.g., an engine control module, a transmission control module, a brake control module, and a body control module), among others. The one or more components 730 can be installed in the front structure 120, the cabin 125, or the rear structure 160 of the electric vehicle 700. The battery pack 705 installed in the electric vehicle 700 can provide electrical power to the one or more components 730 via at least one positive current collector 735 and at least one negative current collector 740. The positive (or first polarity) current collector 735 and the negative (or second polarity) current collector 740 can be connected or otherwise be electrically coupled to other electrical components of the electric vehicle 700 to provide electrical power. The positive current collector 735 (e.g., a positive busbar) can be connected or otherwise electrically coupled with each positive current collector 735 of each battery module 500 in the battery pack 705. The negative current collector 740 (e.g., a negative busbar) can be connected or otherwise electrically coupled with each negative current collector 525 of each battery module 500 in the battery pack 705.

Figure 8:
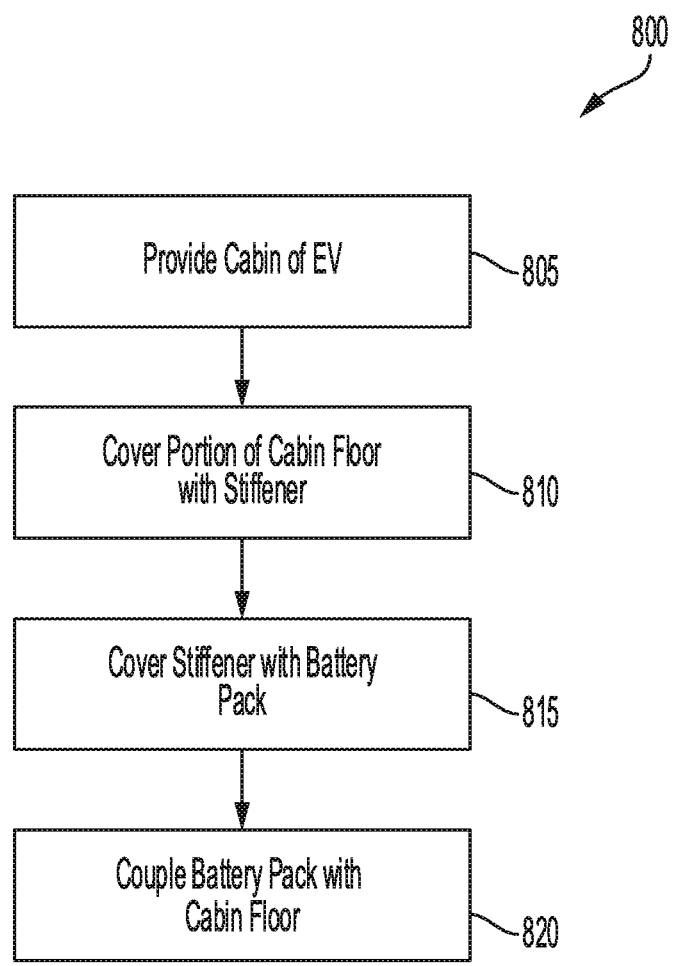
FIG. 8 depicts a method for assembling an electric vehicle.

FIG. 8 depicts a method 800 for assembling an electric vehicle. The functionalities of the method 800 can be implemented or performed using system or apparatuses discussed above in conjunction with FIGS. 1-7. The method 800 can include providing a cabin of an electric vehicle (ACT 805). The cabin of the electric vehicle can be similar to the cabin 125 of a chassis 108 of an electric vehicle discussed above in relation to FIGS. 1-4. The cabin 125 can include cabin frame side rails 180 and 185 and a cabin floor 155 that extends between the cabin frame side rails 180 and 185. The cabin floor 155 can include a first cabin floor surface 165 positioned on the underside of the electric vehicle. The first cabin floor surface 165 can include a first recess 215 that defines a volume in the cabin floor 155.

The method 800 further includes covering a portion of the cabin floor with a stiffener (ACT 810). A stiffener, such as the stiffeners 105/110 shown in FIGS. 1-4 or one or more of the four stiffeners 405-420 shown in FIG. 4 can be used to cover a portion of the first cabin floor surface 165 of the cabin floor 155. For example, the stiffener 105/110 can include a first stiffener surface 214 that faces the first cabin floor surface 165. The stiffener 105/110 can also include a second stiffener surface 216 that is opposite to the first stiffener surface and that faces away from the first cabin floor surface 165. The stiffener 105/110 can include a first stiffener element 224 that extends out of the first stiffener surface 214 and conforms to a shape of the first recess 215 in the cabin floor 155. The first stiffener element 224 is positioned to align with the position of the first recess 215 in the first floor surface when the stiffener is positioned to cover a portion of the cabin floor 155. In one example, the stiffener 105/110 can be formed using a foam molding process. In some other examples, the stiffener 105/110 can be formed using a milling process on a block of the foam material to achieve the desired shape and size of the stiffener 105/110.

The cabin floor 155 may also include a protrusion 220 that extends out of the first cabin floor surface 165. The stiffener can include a second stiffener element 232 that extends into the first stiffener surface 214 and has a shape that conforms to the shape of the protrusion 220. The second stiffener element 232 can be positioned on the first stiffener surface 214 such that the second stiffener element 232 aligns with the protrusion 220 in the cabin floor 155 while the first stiffener element 224 aligns with the first recess 215 in the cabin floor 155 when the stiffener 105/110 is positioned to cover a portion of the first cabin floor surface 165.

In some examples, stiffeners, such as the four stiffeners 405-420 can cover portions of the cabin floor 155 that include vibration hotspots 425-440. The vibration hotspots 425-440 can indicate portions of the cabin floor 155 that vibrate with a magnitude that is greater than a threshold value. The stiffeners can include stiffener elements that conform to the shapes of the recesses and protrusion in the cabin floor 155 located where the stiffeners are positioned on the first cabin floor surface 165.

The method 800 further includes covering the stiffener with a battery pack (ACT 815). The battery pack 115 can be positioned over the second stiffener surface 216. The battery pack 115 can include a battery pack recess 206 that defines a volume in the first battery pack surface 280, which faces the stiffener 105/110. The second stiffener surface 216 can include a stiffener element that has a shape that conforms to the shape of the battery pack recess 206. The stiffener element can be positioned on the second stiffener surface 216 such that the stiffener element aligns with the battery pack recess 206 in the first battery pack surface 280.

The method 800 also includes coupling the battery pack with the cabin floor (ACT 820). The battery pack 115 can be fastened to the cabin floor 155 with fasteners as shown in FIG. 2. The battery pack 115 can include apertures that align with the apertures 265 and 295 in the pillar 210 and the central rib 230, respectively. Fasteners such as a screw or a bolt can be inserted through the apertures and a fastener receiving structure such as a nut can receive the screw or the bolt and hold the battery pack 115 securely against the cabin floor 155. The battery pack 115 can be coupled to the cabin floor 155 in a manner such that the stiffener 105/110 is press-fit between the battery pack 115 and the cabin floor 155. The stiffener 105/110 along with the battery pack can contribute to increasing the stiffness of the cabin floor 155, thereby reducing the magnitude of vibrations in the cabin floor 155, and in turn reducing the magnitude of noise generated by the cabin floor 155.

Figure 9:
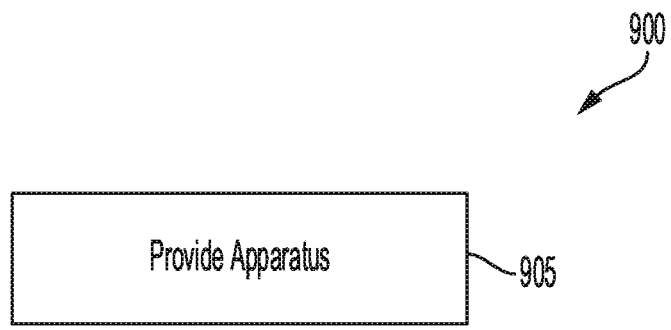
FIG. 9 depicts a method for providing an apparatus including a cabin floor of an electric vehicle, a battery pack, and a stiffener.

FIG. 9 depicts a method 900 for providing an apparatus including a cabin floor of an electric vehicle, a battery pack coupled to the cabin floor and a stiffener disposed between the cabin floor and the battery pack. The functionalities of the method 900 can be implemented or performed using any of the systems and apparatuses detailed above in conjunction with FIGS. 1-8. The method 900 can include providing an apparatus (ACT 905). The apparatus 100 can be installed in an electric vehicle 700. The apparatus 100 can include a cabin 125 positioned between a front structure 120 and a rear structure 160 of the electric vehicle 700. The cabin 125 can include cabin frame side rails, such as a first cabin frame side rail 180 and a second cabin frame side rail 185. The cabin 125 can further include a cabin floor 155 that extends between the first cabin frame side rail 180 and the second cabin frame side rail 185. The cabin floor 155 can include a first cabin floor surface 165 and a second cabin floor surface 205. The first cabin floor surface 165 can be positioned on an underside of the electric vehicle 700. The first cabin floor surface 165 can include a first recess 215 that defines a volume 235 in the cabin floor 155. The apparatus 100 can further include a battery pack 115 that is coupled to the cabin floor 155. The battery pack can include a plurality of battery cells 550 generating a voltage and a current. The battery pack 115 can provide the voltage and the current to the electric vehicle. The battery pack 115 can also include a first battery pack surface 280 that faces the first cabin floor surface 165.

The apparatus 100 further includes a stiffener 105/110 disposed between the battery pack 115 and the cabin floor 155. The stiffener 105/110 can impart stiffness to the cabin floor 155. The stiffener 105/110 can include a first stiffener surface 214 that faces the first cabin floor surface 165. The stiffener 105/110 can include a second stiffener surface 216 that faces the first battery pack surface 280. The stiffener 105/110 can further include a first stiffener element 224 that extends out of the first stiffener surface 214 and conforms to a shape of the first recess 215. The first stiffener element 224 can be positioned on the first stiffener surface 214 to align with a position of the first recess 215 in the first cabin floor surface 165 of the cabin floor 155.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "about," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An electric vehicle apparatus, comprising:
   a cabin positioned between a front portion and a rear portion of an electric vehicle, comprising:
      cabin frame side rails, and
      a cabin floor that extends between the cabin frame side rails, the cabin floor including a first cabin floor surface and a second cabin floor surface, the first cabin floor surface positioned on an underside of the electric vehicle, the first cabin floor surface including:
         a recess that defines a volume in the cabin floor;
   a battery pack coupled to the cabin floor, the battery pack including:
      a plurality of battery cells to generate a voltage and a current, the battery pack to provide the voltage and the current to the electric vehicle, and
      a first battery pack surface that faces the first cabin floor surface; and
   a stiffener disposed between the battery pack and the cabin floor to impart stiffness to the cabin floor, including:
      a first stiffener surface that faces the first cabin floor surface,
      a second stiffener surface that faces the first battery pack surface, and
      a first stiffener element that extends out of the first stiffener surface and conforms to a shape of the recess, the first stiffener element positioned on the first stiffener surface to align with a position of the recess in the first cabin floor surface.

2. The apparatus of claim 1, comprising:
   the first cabin floor surface including a protrusion; and
   the stiffener including a second stiffener element that extends into the first stiffener surface and conforms to a shape of the protrusion in the first cabin floor surface, the second stiffener element positioned on the first stiffener surface to align with a position of the protrusion in the first cabin floor surface.

3. The apparatus of claim 1, comprising:
   the cabin floor including a pillar that extends out of the first cabin floor surface; and
   a fastener coupling the battery pack to the pillar, a space between the battery pack and the pillar on the first cabin floor surface being devoid of the stiffener.

4. The apparatus of claim 1, comprising:
   a battery pack recess defining a volume in the first battery pack surface;
   the stiffener including a second stiffener element that extends out of the second stiffener surface and conforms to a shape of the battery pack recess, the second stiffener element positioned on the second stiffener surface to align with a position of the battery pack recess on the first battery pack surface.

5. The apparatus of claim 1, comprising:
   the first cabin floor surface defining an area including a vibration hotspot, wherein the stiffener is positioned to cover the area including the vibration hotspot.

6. The apparatus of claim 1, comprising:
   an adhesive layer disposed between the first cabin floor surface and the first stiffener surface.

7. The apparatus of claim 1, wherein the stiffener has a compressive strength value between 0.1 mega-pascals and 0.4 mega-pascals.

8. The apparatus of claim 1, wherein a thickness of the stiffener has a value between 6 millimeters and 30 millimeters.

9. The apparatus of claim 1, wherein the stiffener is impermeable to liquids.

10. The apparatus of claim 1, wherein the stiffener is devoid of a water-proof bag surrounding the stiffener.

11. The apparatus of claim 1, wherein at least one dimension of the stiffener is equal to a corresponding dimension of the battery pack.

12. The apparatus of claim 1, comprising:
   the battery pack coupled to the cabin floor such that the stiffener is press-fit between the first cabin floor surface and the first battery pack surface.

13. The apparatus of claim 1, wherein the stiffener is a first stiffener, comprising:
   the cabin frame side rails including a first cabin frame side rail and a second cabin frame side rail;
   a central rib formed on the cabin floor, the central rib having a rib surface that is raised in relation to the first cabin floor surface, the central rib positioned between the first cabin frame side rail and the second cabin frame side rail;
   the first stiffener and a third stiffener positioned between the central rib and the first cabin frame side rail; and
   a second stiffener and a fourth stiffener positioned between the central rib and the second cabin frame side rail.

14. The apparatus of claim 13, comprising:
   a fastener receiving structure formed on the central rib; and
   a fastener coupling the battery pack to the central rib such that the first stiffener, the second stiffener, the third stiffener, and the fourth stiffener is press-fitted between the first cabin floor surface and the first battery pack surface.

15. The apparatus of claim 1, comprising:
   the stiffener including a rigid polyurethane foam to contribute to a rigidity of the cabin floor.

16. A method to stiffen a cabin floor of an electric vehicle, comprising:
   providing a cabin positioned between a front portion and a rear portion of an electric vehicle including cabin frame side rails, and a cabin floor that extends between the cabin frame side rails, the cabin floor including a first cabin floor surface and a second cabin floor surface, the first cabin floor surface positioned on an underside of the electric vehicle, the first cabin floor surface including a recess that defines a volume in the cabin floor;
   covering at least a portion of a first cabin floor surface with a stiffener, the stiffener having a first stiffener surface that faces the first cabin floor surface, a second stiffener surface opposite the first stiffener surface, and a first stiffener element that extends out of the first stiffener surface and conforms to a shape of the recess, the first stiffener element positioned on the first stiffener surface to align with a position of the recess in the first cabin floor surface; and
   covering the second stiffener surface with a battery pack including a plurality of battery cells generating a voltage and a current, the battery pack providing the voltage and the current to the electric vehicle, the battery pack having a first battery pack surface that faces the cabin floor surface, and
   coupling the battery pack to the cabin floor.

17. The method of claim 16, comprising:
coupling the battery pack to the cabin floor by fastening the battery pack to a pillar on the first cabin floor surface that extends out of the first cabin floor surface; and
press-fitting the stiffener between the first cabin floor surface and the first battery pack surface.

18. The method of claim 16, comprising:
covering the stiffener with the battery pack such that a recess in the first battery pack surface is aligned to a second stiffener element that extends out of the second cabin floor surface and conforms to a shape of a volume defined by the recess in the first battery pack surface.

19. The method of claim 16, comprising:
disposing an adhesive layer between the first cabin floor surface and the first stiffener surface.

20. An electric vehicle, comprising:
a chassis, comprising:
a cabin positioned between a front portion and a rear portion of an electric vehicle, comprising:
cabin frame side rails;
a cabin floor that extends between the cabin frame side rails, the cabin floor including a first cabin floor surface and a second cabin floor surface, the first cabin floor surface positioned on an underside of the electric vehicle, the first cabin floor surface including:
a recess defining a volume in the cabin floor;
a battery pack coupled to the cabin floor, the battery pack including:
a plurality of battery cells generating a voltage and a current, the battery pack providing the voltage and the current to the electric vehicle, and
a first battery pack surface that faces the first cabin floor surface; and
a stiffener disposed between the battery pack and the cabin floor for imparting stiffness to the cabin floor, including:
a first stiffener surface that faces the first cabin floor surface,
a second stiffener surface that faces the first battery pack surface, and
a first stiffener element that extends out of the first stiffener surface and conforms to a shape of the recess, the first stiffener element positioned on the first stiffener surface to align with a position of the recess in the first cabin floor surface.

\* \* \* \* \*